United States Patent [19]

Artjushenko et al.

[11] Patent Number: 5,734,765
[45] Date of Patent: Mar. 31, 1998

[54] DAMAGE RESISTANT INFRARED FIBER DELIVERY DEVICE AND SYSTEM

[75] Inventors: Vjacheslav G. Artjushenko, Moscow, Russian Federation; Wolfgang Neuberger, Monchengladbach, Germany

[73] Assignee: CeramOptec Industries Inc., East Longmeadow, Mass.

[21] Appl. No.: 518,761

[22] Filed: Aug. 24, 1995

Related U.S. Application Data

[63] Continuation of Ser. No. 280,605, Jul. 26, 1994, abandoned.

[51] Int. Cl.⁶ .................................................. G02B 6/26
[52] U.S. Cl. ................................... 385/31; 385/123
[58] Field of Search ......................... 385/31, 11, 124, 385/23, 77, 123

[56] References Cited

U.S. PATENT DOCUMENTS

| | | | |
|---|---|---|---|
| 4,381,882 | 5/1983 | Sabine | 385/31 X |
| 4,641,912 | 2/1987 | Goldenberg | 385/31 |
| 4,830,462 | 5/1989 | Kerny et al. | 385/31 |

*Primary Examiner*—John D. Lee
*Assistant Examiner*—Phan T. H. Palmer
*Attorney, Agent, or Firm*—Bolesh J. Skutnik

[57] ABSTRACT

Terminations for an infrared transmitting optical fiber in laser lower delivery systems are described which enhance the system's transmittance and suppress the probability of laser induced damage within the system. To minimize reflection losses, the input fiber end surface is terminated at a certain angle relative to the fiber's axis and the laser is positioned such that the incident laser beam strikes the input fiber end surface at Brewster's angle. For polarization maintaining fibers, it is recommended that the output fiber end be terminated with or without a solid optical output tip where the angles of the fiber output surface are also at Brewster's angle. Alternative means, which are described, for obtaining reliable delivery of high laser power in laser medical or industrial applications include using hollow waveguides attached to the output fiber end and feedback devices to prevent overheating of the output fiber ends.

28 Claims, 4 Drawing Sheets

DAMAGE RESISTANT INFRARED FIBER DELIVERY DEVICE AND SYSTEM

This is a continuation of application Ser. No. 08/280,605, filed Jul. 26, 1994 (abandoned).

BACKGROUND OF THE INTENTION

1. Field of the Invention

The present invention relates to an optical fiber power transmission device and system. The invention is particularly useful in infrared optical fibers for transmitting power in the range of 1-100 watts which is commonly used in surgical applications.

2. Information Disclosure Statement

In most practical applications, an optical fiber initially suffers laser induced damage at its input and output surfaces. This occurs for several reasons. First, to heighten the efficiency of a laser ablation process, the laser power intensity delivered by the fiber must be as high as possible at the irradiated tissue zone. Consequently, the laser's intensity will be much higher at the output and input surfaces than at the lateral surface.

Second, the absorption at the end surface of a very pure optical fiber material is always substantially higher than the absorption throughout its volume. This surface absorption is intensified during infrared optical procedures because materials surrounding the output end tend to absorb laser light at that frequency. That is, most organic molecular substances in water and other typical contaminations absorb infrared radiation from 3 to 20 um. On the other hand, the lateral surface of a fiber is usually protected by a polymer jacket and by a loose polymer sleeve which insulate the lateral surface from light absorbing contaminations and from mechanical damage. Since surgical applications are especially prone to contamination of the output fiber tip, a reliable protection from laser induced damage or overheating is needed.

Third, due to the physics of light reflection between optical materials having different densities, the power density near the input and output surfaces becomes concentrated. That is, an incident laser beam wave (having an amplitude $A_i$) that leaves a first media (with a refractive index $n_1$) and perpendicularly enters a more dense media (with a refractive index n) will generate interference in the form of a reflected wave. This refractive wave will have an amplitude $A_r$. This results in a refracted or transmitted wave having an amplitude $A_o$ ($A_o=(A_i-A_r)$). The power density at the end surface is proportion to the square of $A_o$ ($A_o^2=(A_i-A_r)^2$). For a wave traveling from the more dense media, the amplitudes of the incident and reflected waves are compounding, and thus, the intensity of the laser radiation in the output end surface layer is proportional to $A_o^2=(A_i+A_r)^2$. The difference in power density near the input and output end surfaces quickly grows according to the refractive index ratio $n/n_1$ because of the light reflected from the end surfaces quantified by intensity R:

$$R=(n/n_1)^2=((n-n_1)/(n+n_1))^2 \quad (1).$$

Due to the rather high refractive index of infrared fiber materials (for example, 2.1-2.2—for Silver Halide Crystals; 2.4-3.1—for Chalcogenide Glasses; 1.7—for Sapphire; and 1.5-1.6—for Fluoride Glasses) and the relatively low refractive index of the media surrounding the fiber's output end, the intensity R at the output end becomes quite significant.

Additionally, a portion of the reflected laser power is usually absorbed by a cable connector, and its overheating could also lead to the damage of the delivery system. Thus, reflective losses greatly contribute to laser induced damage.

Fourth, an additional factor causing damage at the fiber's output end is the formation of a speckle-pattern. A speckle-pattern forms because of the interference of propagating modes of coherent laser light in a multimode fiber. Speckle-pattern is a non-homogenous distribution of the laser light intensity over the fiber core cross-section, and its intensity spikes could exceed the average intensity value by several fold, and cause "hot spots" at the output end surface. Light absorption is increased at these hot spots. The higher absorption launches a catastrophic cycle of intensifying the hot spots which in turn further increases the light absorption. Eventually, this cycle causes the hot spots to melt or sublimate and soon the whole fiber end surface is destroyed. The input surface may also have a non-uniform speckle pattern for a multimode laser beam, but such a speckle-pattern manifests fewer intensity spikes due to the relatively small number of laser modes.

Fifth, the reflection losses at both ends of the fiber increase as the refractive index of the core increases. This can cause a substantial drop of in the transmission T of laser light as determined by:

$$T=(1-R)^2 * exp(-A \times L)=(4*n/(n+n_1)^2)^2 * exp(-A \times L) \quad (2)$$

wherein A is the optical attenuation coefficient and L is the total length of the fiber. This equation takes into account the multiple reflections at the both ends of the fiber. For example, with an As-S-based Chalcogenide Glass fiber (n=2.4), the transmission T=69% even for A=0.

The last factor considered here in causing damage to the output end is the process of laser ablation. Ablation generates a stream of contamination—debris and drops of tissue, vapor and plume—towards the fiber's output end from the irradiation zone. Damage occurs due to drastic contamination of the fiber's end surface.

Means to prevent damage to the fiber ends have already been suggested in the patents of Goldberg and al. and Karny et al. Goldberg suggests decreasing the apparent density of energy entering the fiber by using a funnel-shaped input or a water-filled cavity at the input end. A lens at the output end of the fiber functions to concentrate the output beam so as to increase or "reconstitute" its density.

The reasonable advantages of such a means could not eliminate, however, all the problems discussed above. A funnel-type shaping of the fiber input reduces the power density at the input surface, but the reflection losses remain the same. Moreover, the cost of a tapered fiber is much higher than a fiber with a uniform diameter. Additionally, although the water-filled cavity is transparent in the 0.3-2.5 um region of spectrum, it will block radiation in the 2.6-20 um wavelength range. Finally, even though an output end microlens could be formed for an IR-fiber, it will increase the reflection losses and it will not protect the output surface from contamination. Indeed, contamination byproducts will be intensified by the microlens concentrating the output laser beam energy towards the output end surface.

The Karny et al. patent contains a description of a power delivery device. This device comprises an optical fiber inside a loose protective sleeve thereby forming a gas passageway. It also has a tubular waveguide secured to the protective sleeve but unattached to the optical fiber thereby permitting the fiber to move with respect to the tubular waveguide during the bending of the device. This invention has the advantage of protecting the output end with the hollow waveguide and the gas stream.

Although the disclosure in Karny et al. prevents end surface contamination, several problems nevertheless remain. The reflection losses continue unabated at the output end, and the partially absorbed reflected power will heat the surrounding hollow waveguide and protective sleeve. Additionally, the optical window, suggested in the patent for the protection of the inner surface of a tubular waveguide, will cause additional reflection losses and heating of the output tip of the device. Furthermore, the hollow waveguide has an inner diameter substantially larger than the fiber core diameter which will inevitably deteriorate the output beam quality. The output beam quality is characterized by the factor ($\Phi_c \times \cos \omega$), where $\Phi_c$ is the diameter of the fiber core and $\omega$ is the beam divergence. The hollow dielectric waveguides (single-crystalline or ceramic Sapphire, silica, mullite or other oxide glasses), known for having the lowest optical losses for a single mode radiation delivery, cannot be used in the suggested combination with a multimode fiber because of the very high optical absorption for multimode radiation. This high absorption leads to a very low transmission even through a short (few mm) piece of the hollow waveguide, and consequently to fast overheating. Finally, the free movement of the output fiber tip inside the hollow waveguide could vary the parameters of the beam, and disturb the expected stability of the ablation process.

Both cited patents fail to address reducing the reflection losses at fiber ends and preventing damage of the output fiber end in case of overheating due to contamination by the ablation by-products. Although the known technique of depositing a anti-reflective coatings on the surface of the highly reflective material could be used on the ends in principle, in practice, such a technological operation is complicated, time-consuming and expensive. In addition, most AR-coating IR-films are very delicate and too sensitive to possible contamination during the depositing process.

SUMMARY OF THE PRESENT INVENTION

The present invention is directed at providing an optical fiber laser power delivery system having better transmittance and more reliable protection against laser induced damage at its input and output surfaces. The invention comprises an optical fiber device for transmitting laser radiation. An incident laser beam enters the fiber at an input surface. To reduce reflection losses, the input surface is inclined at a certain angle relative to the fiber's axis, and the laser is positioned such that the incident laser beam strikes the input surface at Brewster's angle. The device may also have a solid optical output tip pressed to the output surface of the fiber. Alternatively, the tip may be fixed such that its input edge is oriented at Brewster's angle relative to the laser beam leaving the output end of the fiber. In another embodiment, a single mode hollow waveguide may be fixed coaxially to the fiber axis at the output end of a single mode fiber. If the fiber maintains light polarization, the waveguide would be fixed coaxially to a laser beam leaving the output surface at Brewster's angle. Yet another embodiment uses a hollow tube fixed at the fiber's output end such that a certain distance is maintained between the tube's output edge and the fiber's output surface to prevent the divergent radiating beam from touching the inner surface of the tube. Still another embodiment comprises a feedback device and a laser power managing device to prevent overheating of an output tip, waveguide or tube by reducing or switching off the power.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

A temperature measuring thermocouple or thermistor is shown schematically at the FIGS. 4, 5, 6, and 7.

DETAILED DESCRIPTION OF THE PRESENT INVENTION

The present invention is directed at providing an optical fiber laser power delivery system having better transmittance and more reliable protection against laser induced damage at its input and output surfaces. The invention comprises an optical fiber device for transmitting laser radiation. An incident laser beam enters the fiber at an input surface. To reduce reflection losses, the input surface is inclined at a certain angle relative to the fiber's axis, and the laser is positioned such that the incident laser beam strikes the input surface at Brewster's angle. The device may also have a solid optical output tip pressed to the output surface of the fiber. Alternatively, the tip may be fixed such that its input edge is oriented at Brewster's angle relative to the laser beam leaving the output end of the fiber. In another embodiment, a single mode hollow waveguide may be fixed coaxially to the fiber axis at the output end of a single mode fiber. If the fiber maintains light polarization, the waveguide would be fixed coaxially to a laser beam leaving the output surface at Brewster's angle. Yet another embodiment uses a hollow tube fixed at the fiber's output end such that a certain distance is maintained between the tube's output edge and the fiber's output surface to prevent the divergent radiating beam from touching the inner surface of the tube. Still another embodiment comprises a feedback device and a laser power managing device to prevent overheating of an output tip, waveguide or tube by reducing or switching off the power.

The present invention provides a number of important advantages which are particularly important when used with infrared optical fibers in laser surgery. The specific features of the invention consist of five means of protecting the fiber against laser induced damage while improving fiber transmission.

I

Due to the presence of linear polarization in most commercial CO2-lasers used in surgery, the Brewster angle reflection can be applied to minimize the reflection losses for the incident laser beam entering a fiber at its input surface. It is well known that the angles of the incident and refracted rays, namely $\beta_1$ and $\beta$, are related by Snell's law such that:

$$n_1 * \sin \beta_1 = n * \sin \beta \quad (3)$$

Figure 1:
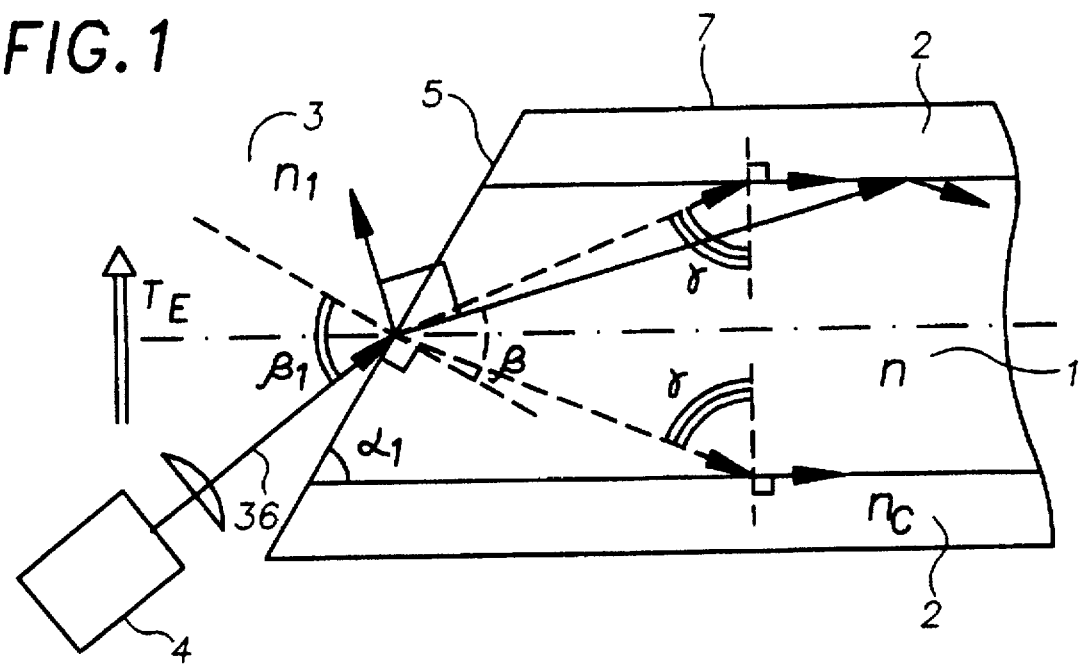
FIG. 1 is a schematic diagram of a laser, an input end, and the trajectories of the incident, reflected and refracted (transmitted) rays.

The incident and reflected rays are at equal angles to the normal of the input surface according to the law of specular reflection. Thus, at a particular angle of incidence $\beta_1$, for which $\beta_1 + \beta$ is 90 degrees, the reflected ray makes an angle of 90 degrees with the refracted (i.e., transmitted) ray, as shown in FIG. 1. The direction of oscillation of the electrons in a dense media, such as a fiber, is transverse to the direction of the transmitted ray. However, the component of electron motion that lies in the plane of incidence is not perpendicular to the direction of the reflected ray. Only the component of motion projected perpendicular to the reflected ray contributes to the reflected radiation. At Brewster's angle of incidence, the component of electron motion in the plane of incidence is exactly along the direction of the reflected ray, and consequently results in no reflected light. The reflected light is completely polarized perpendicular to the plane of incidence for depolarized light or for an incident ray which has a polarization plane different from the plane of incidence. From the described condition $\beta = (90° - \beta_1)$ (i.e., $\sin \beta$ equals $\sin(90° - \beta_1)$) which is $\cos \beta_1$ and from Formula 3, the Brewster's angle $\beta_1$ is determined by:

$$\tan \beta_1 = n/n_1 \quad (4)$$

Thus, the inclination angle $\alpha_1$ of the input surface to the fiber's axis, and Brewster's angle of the input surface to the incident ray provides for the propagation of refracted rays within a range of angles $\alpha$. This range for a multimode fiber is limited only by the angles of the total internal reflection. The angle of inclination for a single mode fiber, however, will be fixed at a single angle $\alpha_{sm}$ to provide for the axial propagation of the refracted ray.

In the case of a polarization maintaining single mode fiber, it is possible to reduce reflection losses not only at the input end, but also at the output end. To this end, the output surface is inclined at the angle $\alpha_2$ as determined by Brewster's angle $\beta_2$ for the exiting ray:

$$\alpha_2 = \text{Arcsin}((n_2/n) * \sin \beta_2) \quad (5)$$

wherein $\beta_2$ is Brewster's angle for the output surface surrounded by a media with a refractive index $n_2$. Reducing reflection losses by using Brewster's angle has very practical advantages. For example, such a use will elevate the transmission through an IR-fiber delivery system without an AR-coating at the fiber ends. Additionally, it can substantially reduce the probability of laser induced damage at fiber ends, especially for the output surface of the polarization maintaining single mode fiber where the power density will be reduced by the factor $(2n/(n+n_2))^2$. It should be realized, however, that even for other types of fibers, the output power density will be reduced at the inclined output surface simply because the incline provides a larger area of the output surface for the same magnitude of laser power.

II

Another means of preventing damage to the output surface is to protect it with a solid optical tip, fabricated from an IR-transparent material suitable for surgical conditions. Such tips include sapphire tips for the delivery of Er-laser power which has wavelengths from 2.79 to 2.94 um, or Diamond tips for wavelengths ranging from visible to 20 um. These materials possess high optical properties when used in high temperatures and in the IR-range. However, the incorporation of a tip will necessarily impart additional reflective surfaces in the system which increase the reflection losses.

These reflective losses may cause the output tip to overheat if an optical gap exists between the fiber's output surface and the tip's input edge. Consequently, two embodiments of the invention exist. The first embodiment presses the tip's input edge to the fiber's output surface such that no optical gap exists between them. This configuration reduces reflection losses at these surfaces to only the reflection loss at the boundary of the fiber and tip. The losses between a Silver Halide polycrystalline MIR-fiber and the diamond tip, for example, will be small due to the relatively close values of their refractive indexes (i.e., refractive indexes of 2.2 and 2.4 respectively correspond to a reflection loss R=0.2% as calculated by Equation 1). The second embodiment is used in the case of a polarization maintaining single mode fiber. There, the tip's input edge is inclined in accordance with Brewster's angle to reduce reflection losses.

III

Other embodiments of the invention combine the advantages of a hollow dielectric waveguides. Such waveguides possess the smallest optical losses among the various hollow waveguides, and have a higher resistance to laser induced damage than solid state IR-fibers fabricated from delicate IR-materials such as Fluoride, Chalcogenide or Chalcohalide Glasses, and Silver Halide Crystals. In the present invention, a single mode dielectric waveguide is preferred with a single mode fiber. This single-mode combination offers high laser light intensity at the tissue and lower optical losses in the waveguide as compared to the Karny invention. In the Karny invention, the intensity of the laser light in the waveguide is decreased substantially compared to the fiber, and the waveguide possesses higher optical losses leading to overheating. The choice of the dielectrics for the hollow waveguides is determined by the desired spectral range. For example, the dielectric—with a complex index of refraction V=n–iK, where K is the extinction coefficient and n is the ordinary index of refraction—should be chosen with an n less than unity at the wavelength of a CO2-laser. Sapphire, Beryllium Oxide and other oxide glasses could be used for a dielectric in waveguides suitable for CO2-laser. Moreover, hollow Sapphire fibers exhibit low attenuation in the region between 9.6–17.2 um. In the case of a polarization maintaining single mode fiber where the reflection losses at the output end are reduced by the inclination of the output surface, the hollow waveguide is fixed coaxially relative to the axis of the beam leaving the output surface at Brewster's angle. For the single mode fiber which does not maintain polarization, the output surface is terminated perpendicular to the fiber axis and the hollow waveguide is fixed coaxially to the fiber axis.

IV

Yet another embodiment of the present invention uses a hollow tube to protect the fiber's output end. The distance between the fiber's output surface and the tube's output edge is such that the divergent laser beam avoids the inner surface of the tube. In this regard, the present invention differs from the Karny patent. The hollow tube contains at least two holes at the lateral tube surface. These are cut from its edge to provide an exit for the gas stream used to protect the fiber end from contamination by ablation by-products. In the event of accidental contact of the hollow tube edge with tissue, these holes will prevent contamination of the output end because the protective gas stream flowing towards the tissue will not be blocked at the tube's output edge.

V

The embodiments of the invented system also include temperature control means at the output edge of the optical tip, hollow waveguide, or hollow tube. The temperature control means may be a thermocouple or a thermistor. In fact, it may even be the IR-fiber itself since it is possible to monitor the temperature of the output edge by the pyrometry of its IR-irradiation. In this latter embodiment, the system may comprise a mirror chopper located near the input end of the fiber for directing the IR-radiation leaving the input end to a IR-radiometer. This embodiment may further comprise a laser power managing device (LPMD) operatively connected to the IR-radiometer for controlling the pulses of laser energy to the tissue. The LPMD modulates the chopper at a certain frequency to achieve the desired output power. When open, the chopper will transmit the incident laser beam to the fiber. However, when closed, it will block the laser power and redirect the IR-radiation from the fiber to the radiometer. The chopper in the combination with the IR-radiometer and laser power managing device could be arranged as a "smart" laser power delivery system, wherein the temperature of the output edge of the delivery device would not exceed a dangerous point for the fiber or for the tissue. Even the temperature of the irradiated tissue could be predetermined and controlled by a microprocessor and the physician conducting the operation.

Now referring to the drawings, FIG. 1 illustrates the trajectories of rays in a longitudinal sectional view of an input end of a multimode fiber 7. The laser beam's plane of polarization corresponds to the plane shown in the sectional view. The fiber 7 has an input surface 5 inclined at angle $\alpha_1$ relative to the axis of the fiber 7. The fiber 7 has a core with an axis and a refractive index n higher than 1.6, and a cladding with a refractive index $n_{cl}$ lower than the refractive index n. An incident ray 6 generated by laser source 4 enters the input surface 5 at Brewster's angle $\beta_1$. The angle $\beta$ of the refracted (transmitted) ray is perpendicular to the reflected ray. The reflected ray can only contain the energy of the incident beam having a light polarization perpendicular to the shown plane. FIG. 1 also shows a method of beam focusing using a lens 3 from the laser source 4 to the input surface 5 of the fiber 7. A deviation of the real laser beam parameters from the ideal ray will bring some reflection losses—slightly higher than zero in the case of the ideal linearly polarized ray. Nevertheless, the reduction of reflection losses at the input surface 5 will occur throughout a range of angles. The variation of the angles is determined by the refractive indices n, $n_c$, and $n_1$ of the core, cladding and surrounding medium respectively as follows:

$$\alpha_1 \min = 90 - \arcsin((n_1/n)\sin(\arctan(n/n_1))) - \arccos(n_c/n) \quad (6)$$

$$\alpha_1 \max = 90 - \arcsin((n_1/n)\sin(\arctan(n/n_1))) + \arccos(n_c/n) \quad (7)$$

Figure 2:
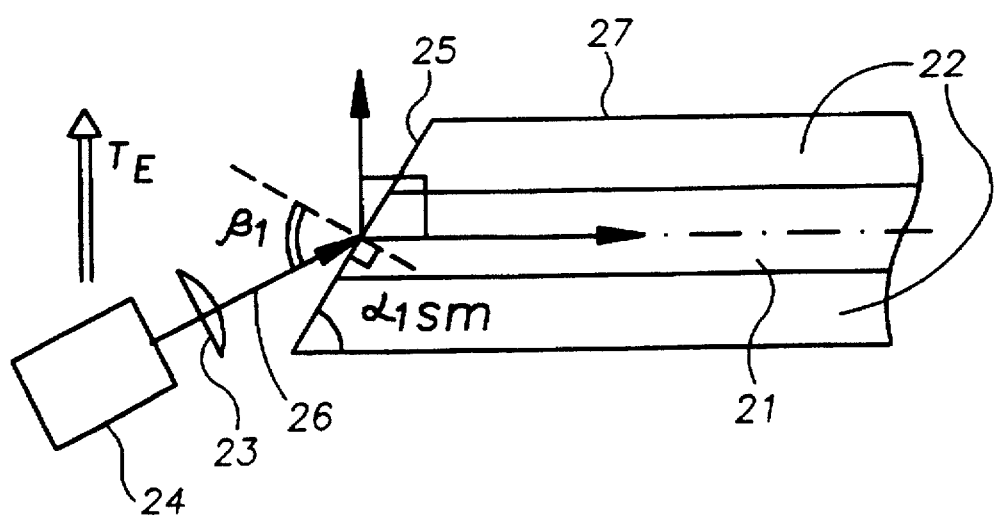
FIG. 2 is a longitudinal sectional view illustrating the trajectories of the rays for a single mode fiber.

FIG. 2 illustrates an input end of a single mode fiber in contrast to a multimode fiber as shown in FIG. 1. The single mode fiber core 21 and cladding 22 are shown with a scheme of coupling a laser beam 26 from the laser 24 by the lens 23 to an input surface 25. The angle $\alpha_1$sm of the input surface inclination is determined only by the coaxial propagation of the refracted (transmitted) beam:

$$\alpha_1 sm = 90 - \arcsin((n_1/n)\sin(\arctan(n/n_1))) \quad (8)$$

The single mode IR-fiber with such an inclined input surface 25 provides a higher level of transmission for the laser fiber system. The danger of laser induced damage is also reduced at the input end because the energy density on the input surface 25 is lessened. That is, the same laser beam intensity is distributed over a greater area on an inclined input surface 25 compared to a perpendicular input surface. Additionally, the incoming laser beam suffers low reflection losses, especially at the input end, if it enters the input surface at Brewster's angle.

Moreover, the intensity of the laser power delivered by the single mode fiber 27 can be increased to a higher value than that for any multimode fiber because of the absence of a speckle-pattern (and related hot spikes, especially for the output surface), and a higher efficiency of heat dissipation from the fiber core 21 to the fiber cladding 22 (as determined by the highest ratio of the lateral surface of the fiber core to the core volume for a thin single mode fiber). Thus, a single mode fiber termination reduces the danger of laser induced overheating.

Figure 3A:
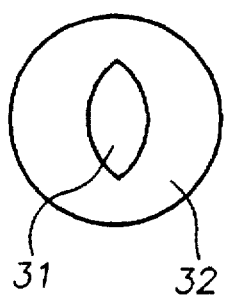
FIG. 3A is a cross sectional view of the fiber's core and cladding.
Figure 3:
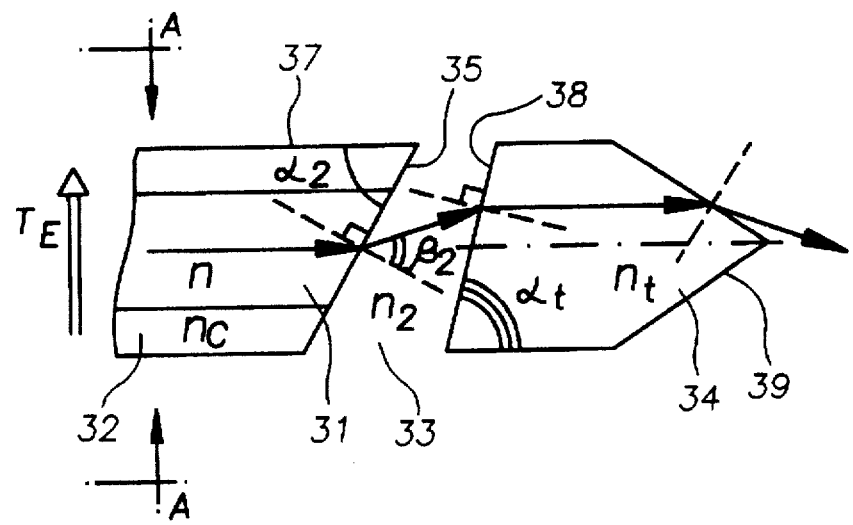
FIG. 3 is a schematic diagram of a output end of a polarization maintaining single mode fiber and an optical tip which is positioned according to Brewster's angle to minimize damage to the output surface.
Figure 4:
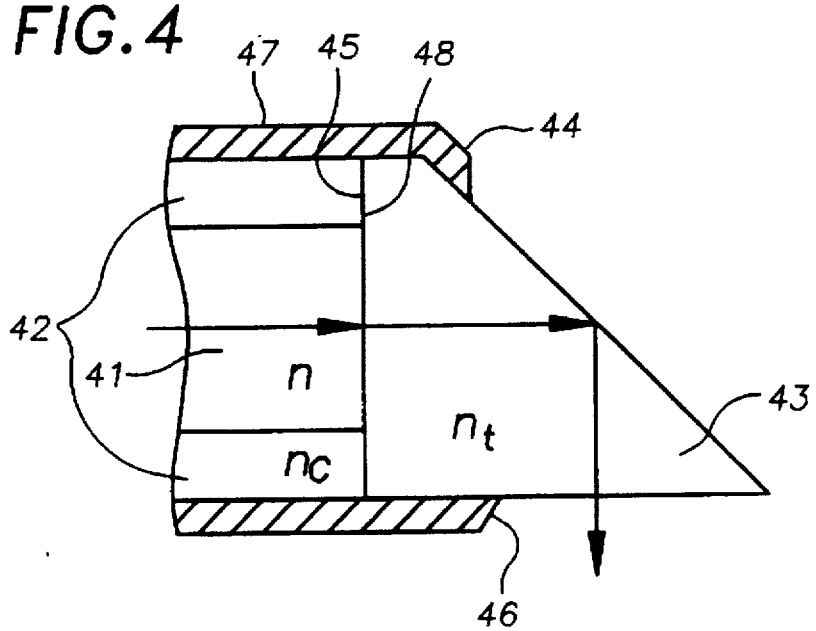
FIG. 4 is a longitudinal sectional view of the output end with an optical tip which is fixed to the output surface without an optical gap.

The major limiting factor in reducing damage for such a delivery system remains the reflection at the output end. This factor can be suppressed in two ways as illustrated in FIGS. 3 and 4. FIG. 3 illustrates a longitudinal section of an output end 37 of a polarization maintaining single mode fiber in the plane of polarization. The fiber maintains the polarization due to an elliptical shaped core 31 in a cladding 32. The output end 37 is inserted into a surrounding media 33 and is terminated at an output surface at an angle $\alpha_2$ relative to the fiber's axis. Angle $\alpha_2$ is determined by formula (5). The ray from such an output surface will be inclined at Brewster's angle $\beta_2$ as determined by formula:

$$\tan \beta_2 = n/n_1 \quad (9).$$

At this angle, the reflection losses will be eliminated or reduced to a minimum (total elimination is difficult since an actual output beam has a small divergence). Therefore, terminating the input and output surfaces of a single mode polarization maintaining fiber at angles $\alpha_1$ and $\alpha_2$ respectively minimizes the reflection losses at the ends and reduces the danger of laser induced damage.

Another contributing factor to laser induced fiber damage is the contamination of the output end of the fiber by ablation by-products during the tissue ablation procedure. FIG. 3 illustrates means to protect the output end 37 using a solid optical tip 34. The tip 34 can be fabricated from an IR-material having better resistance to laser induced damage when contaminated. For example, the tip 34 can be made from diamond or other materials with a higher melting point than the materials of IR-fibers (except sapphire fiber, where the disposable output tip could be made from sapphire also).

Despite the benefits of the tip 34, its input edge 38 can add reflective losses to the delivery system. To eliminate the additional reflective losses at the input edge 38, it should be inclined at an angle αt as determined by Brewster's angle:

$$\alpha_t = 90 + \arctan(n/n_2) - \arcsin((n_2/n)\sin(n/n_2)) - \arctan(n_t/n_2)$$

The output edge 39 of the tip 34 can vary for distinct types of contact or non-contact operations, and for the correction of the output beam direction and focus.

FIG. 4 illustrates another version of the fiber with a core 41, a cladding 42, and an output end 47 protected with an optical tip 43. An input edge 48 of tip 43 optically contacts the output surface 45 of the fiber. By pressing tip 43 to the fiber by means of an external protective cladding 44, no optical gap between the output surface 45 and the input edge 48 tip exists. The elimination of the optical decreases the reflective losses. That is, with a gap, high reflection losses occur at the interface between the fiber and the surrounding medium and the surrounding medium and the tip. Since the refractive indexes of these materials differ significantly, the reflection losses are further increased (see formula (1)). With no gap, however, reflection losses occur only at the interface of the fiber and the tip. Moreover, the difference in the refractive indexes of these IR-materials is small which further decreases the losses. The shape of the tip's output edge could vary from the shown 45° angle to any shape needed for a distinct operation. The advantage of such protection is that it could be used not only with a single mode polarization maintaining fiber, but also with any single mode or multimode fiber and at any intermediate angle of the output surface.

FIG. 4 also shows a temperature control means 46 to prevent overheating of the output end. As depicted, means 46 could be the junction of a thermocouple or the head of a thermistor. Means 46 provides feedback to a laser power management device (LPMD) (not shown). When the temperature reaches a dangerous level, the LPMD switches off or decreases the input laser power. This prevents damage to the output end of the fiber delivery system.

Figure 5:
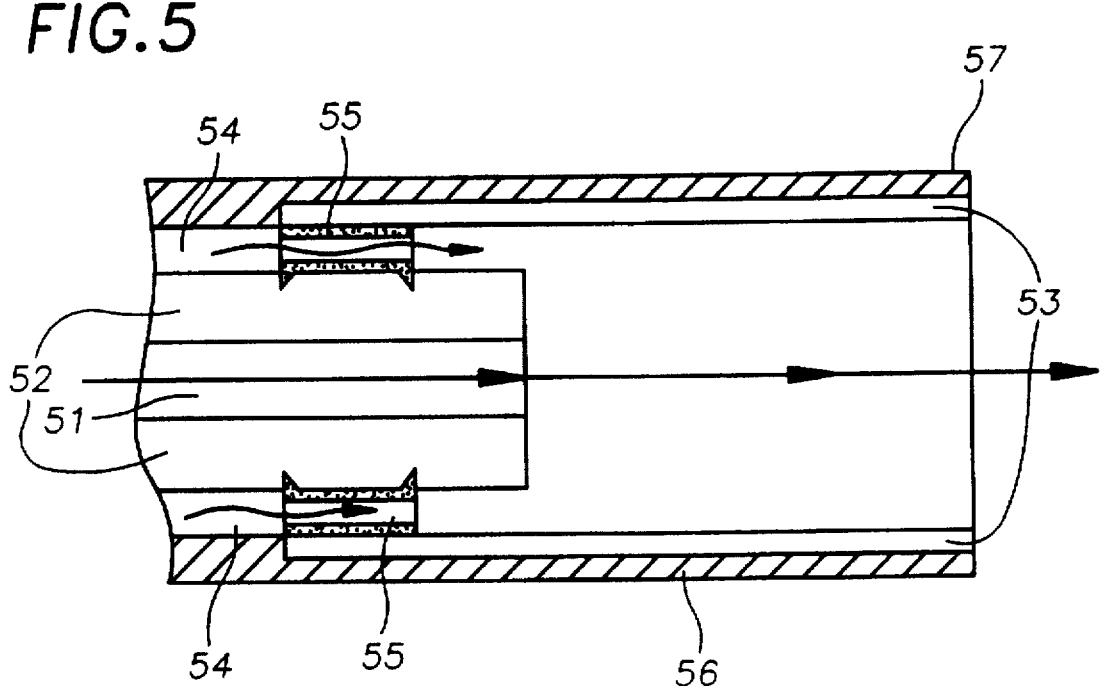
FIG. 5 is a longitudinal sectional view of the output end of the single mode fiber with a hollow single mode waveguide.

FIG. 5 illustrates a longitudinal section of a hollow waveguide for protecting the output end of a single mode fiber against contamination. A single mode fiber with a core 51 and cladding 52 is connected by a ring 55 to a hollow waveguide 53. The hollow waveguide 53 is a straight piece of dielectric material possessing a refractive index less than 1 at the wavelength of the laser light. A common protective loose polymer sleeve 56 encases both the fiber and the waveguide. Sleeve 56 and the fiber form a passageway 54 for gas flow towards the output end. The gas flows through the holes in the ring 55. By combining a single mode fiber with a waveguide, the irradiated laser beam propagates in a single mode. A temperature sensing means 57 is mounted to the device at the output edge of the waveguide because this edge becomes contaminated with ablation by-products first, and consequently overheats first.

Figure 6:
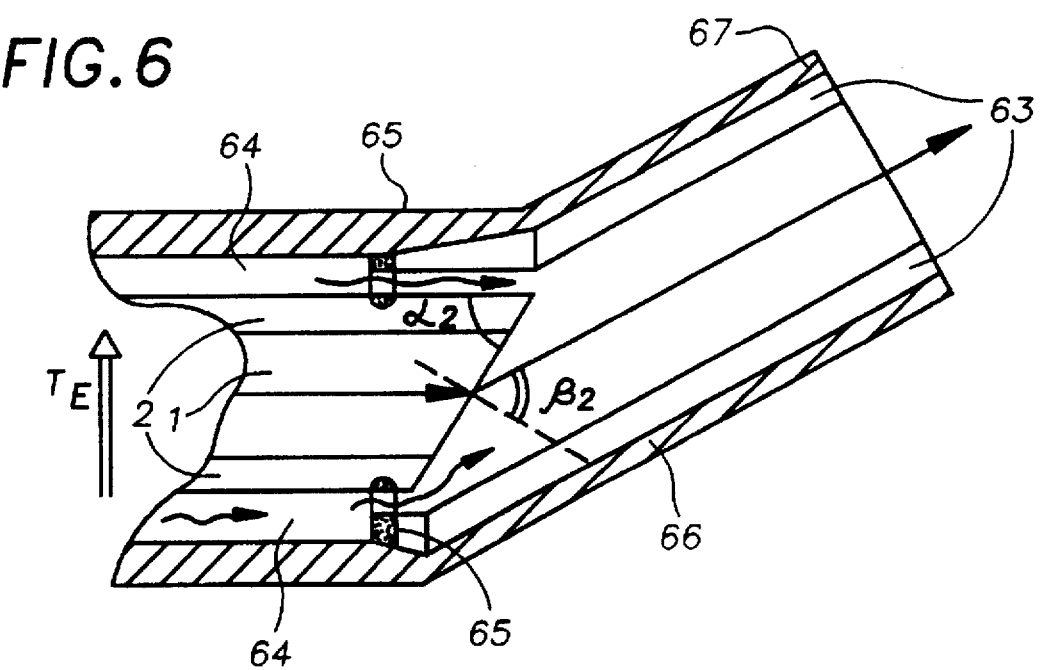
FIG. 6 is a longitudinal sectional view of the output end of polarization maintaining single mode fiber with a hollow single mode waveguide coaxially affixed such that a laser beam radiates from the fiber at the Brewster's angle.

FIG. 6 illustrates a similar combination of a hollow waveguide and a single mode fiber, but the fiber in this embodiment maintains light polarization. Here, the plane of polarization coincides with the longitudinal cross-section. The hollow dielectric waveguide 63 is fixed by a ring 65 coaxially with the laser beam leaving the fiber. The laser beams leaves the fiber at Brewster's angle $\beta_2$ relative to the output surface (see formula 9). A common protective loose polymer sleeve 66 encases both the fiber and the waveguide to prevent their contamination. Polymer Sleeve 66 and the fiber form a passageway 64 for the gas flow to the output end. The ring 65 has holes to allow for the passage of the gas. The gas is non-toxic and inert and/or soluble in a blood to prevent the danger of embelia. The flow of gas provides sufficient pressure to prevent the contamination of the fiber's output end. Furthermore, the gas flow provides sufficient pressure at the tissue surface to remove the "shield" non-transparent charring products caused by the operation. These charring products cause overheating and lead to thermo-damage of surrounding tissue. As described above for the FIG. 5, the output edge of the waveguide could be equipped with temperature control means 67 to monitor the edge and to prevent it from overheating.

Figure 7:
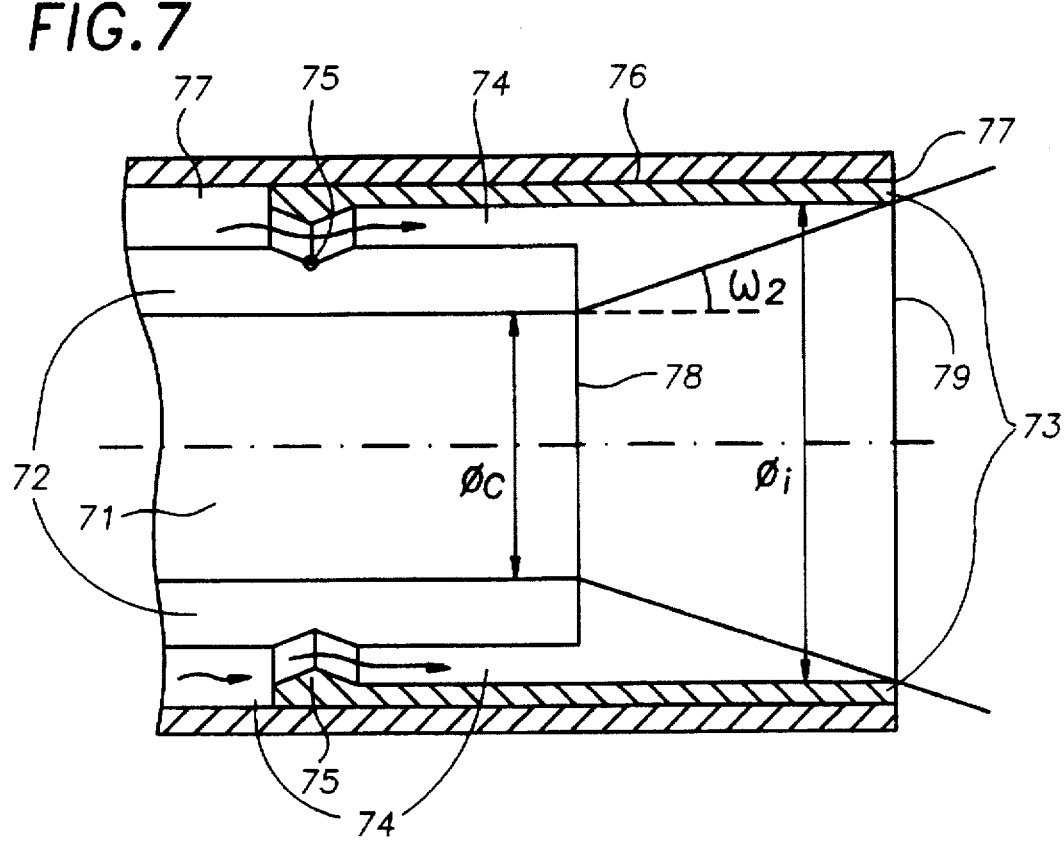
FIG. 7 is a longitudinal sectional view of the output end with a fixed hollow tube positioned such that its inner surface avoids the radiating laser beam.

FIG. 7 illustrates a longitudinal section of the output end of a fiber delivery device comprising any type of fiber with a core 71 and cladding 72, and a hollow tube 73. The tube 73 is mounted to the fiber by a ring 75. A protective loose polymer sleeve 76 encases the fiber and the tube 73. At least 3 features of this embodiment distinguish it from the Karny patent. First, the output surface 78 of the fiber is fixed at a distance L from the output edge of the tube 73. This distance L takes into account the divergence of the output beam such that the inner surface of the tube 73 does not interfere with the beam. This distance depends on the core diameter $\Phi_c$, the inner tube diameter $\Phi_i$ and the divergence of the outcoming beam Θ as follows:

$$L = (\Phi_i - \Phi_c)/(2*\tan(\Theta/2)) \tag{11}$$

Second, the tube 73 need not be a hollow waveguide because it only serves to protect the output end from contamination. Third, the output end is fixed in relation to the tube's output edge at the distance L unlike the Karny scheme where the output end moves freely in a hollow waveguide. As described in FIGS. 5 and 6, a temperature sensing means 77 could be fixed at the output edge of the tube to provide additional protection against overheating.

Figure 8:
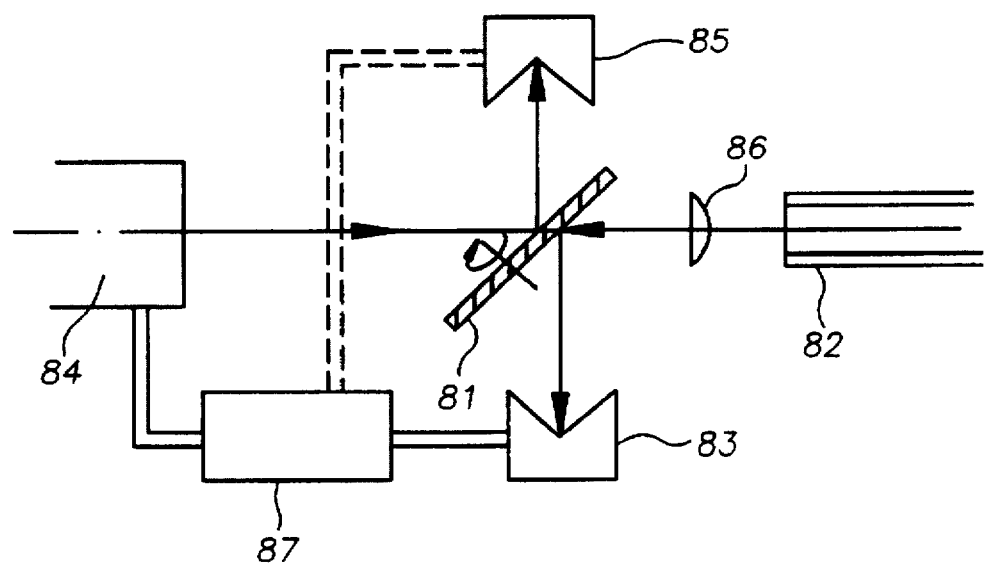
FIG. 8 is a schematic diagram of the laser, input fiber end, mirror chopper, IR-radiometer, and laser power managing device to control the temperature of a output edge of a laser power delivery device.

FIG. 8 illustrates a schematic view of a laser power delivery system with a temperature control means which monitors temperature by measuring IR-radiation rather than by using a thermocouple or thermistor. That is, as the output end heats, it will generate IR-radiation which propagates back through the fiber to the input end. This IR-radiation can then be measured and the laser beam altered to prevent overheating. One embodiment of this scheme is to measure the IR-radiation between laser pulses. This can be accomplished using a mirror chopper 81 which rotates to open and close. In the open position, the laser pulses from laser 84 to the fiber input 82 via the coupling lens 86. In the closed position, the IR-radiation from the input end is reflected to an IR-radiometer 83. The Radiometer 83 generates a feedback signal corresponding to the temperature of the output end, and sends this signal to a laser power managing device (LPMD) 87. The LPMD 87 can assume several different embodiments such as a variable diaphragm for the laser beam, a variable current for laser discharge, etc. The LPMD 87 can be programmed to switch off or reduce power to prevent overheating of the fiber delivery system. Moreover, this embodiment may even monitor and maintain the optimal temperature for a particular laser operation (e.g., 43.5° C.—for laser welding or hyperthermy, 60° C.—for laser coagulation, above 100° C.—for laser cutting, ablation, etc.). The laser power may also be controlled using a power meter 85. In this embodiment, laser light reflects off the chopper 81 and into the power meter 85 when the chopper is in the closed position. The laser power could then be correlated with the IR-radiation measured to control the laser power and temperature at the output end of the fiber.

Obviously, numerous modifications and variations of the present invention are possible in the light of the above teachings. It is therefore understood that within the scope of the appended claims, the invention may be practiced otherwise than as specifically described herein.

What is claimed is:

1. A laser power delivery device comprising:

an infrared transmitting optical fiber:

said fiber having a core with an axis and a refractive index $n$ higher than 1.6, a cladding with a refractive index $n_{cl}$ lower than said refractive index $n$, an input end surrounded by a media with a refractive index $n_1$, and an output end;

said input end being terminated by an input surface;

said input surface inclined at an angle $\alpha_1$ relative to said axis;

said angle $\alpha_1$ ranges from $\alpha_1 min$ to $\alpha_1 max$ as defined by $$\alpha_1 min = 90 - \arcsin((n_1/n)\sin(\arctan(n/n_1))) - \arccos(n_{cl}/n)$$

$$\alpha_1 max = 90 - \arcsin((n_1/n)\sin(\arctan(n/n_1))) + \arccos(n_{cl}/n);$$

a solid optical tip having an input edge and an output edge; and said input edge in intimate contact with said output end of said optical fiber.

2. A laser power delivery system comprising:

a single mode fiber;

said fiber having a core with an axis and a refractive index $n$ higher than 1.6;

a cladding with a refractive index $n_{cl}$ lower than said refractive index $n$;

an input end surrounded by a media with a refractive index $n_1$;

an output end;

said input end being terminated by an input surface;

said input surface inclined at an angle $\alpha_1 sm$ relative to said axis;

said angle $\alpha_1 sm$ is defined by $$\alpha_1 sm = 90 - \arcsin((n_1/n)\sin(\arctan(n/n_1)));$$

a single mode hollow waveguide mounted coaxially with said axis of said fiber; and said waveguide being fabricated from materials having a refractive index $n_w$ less than 1 and having a complex index of refraction $v = n_w + ik$, wherein $k$ is an extinction coefficient.

3. A laser power delivery device comprising:

a polarization maintaining, single mode fiber;

said fiber in turn comprising: a core with a refractive index $n$ higher than 1.6, an axis, and a polarization plane parallel to said axis; a cladding with a refractive index $n_{cl}$ lower than said refractive index $n$; an input end surrounded by a media with a refractive index $n_1$; and an output end surrounded by a media with a refractive index $n_2$;

said output end being terminated by an output surface inclined at an angle $\alpha_2$ relative to said axis;

said angle $\alpha_2$ being defined by $$\alpha_2 = \arcsin((n_2/n)\sin(\arctan(n/n_2))).$$

4. The laser power delivery device of 3, further comprising:

a solid optical tip having an input edge, an output edge, and a refractive index $n_t$;

said input edge being perpendicular to said polarization plane and inclined at an angle relative to said axis; and said angle being defined by $$\alpha_t = 90 + \arctan(n/n_2) - \arcsin((n_2/n)\sin(n/n_2)) - \arctan(n_t/n_2).$$

5. The laser power delivery system of claim 4, further comprising:

a laser optically connected to said fiber;

said fiber generating an incident beam having a linear polarization, said laser being positioned such that said incident laser beam strikes said input surface at an angle $\beta_1$ relative to a perpendicular of said input surface; and said angle $\beta_1$ being defined by $$\beta_1 = \arctan(n/n_1).$$

6. The laser power delivery system of claim 5, further comprising:

an infrared radiometer for measuring IR-radiation leaving said input end; and said infrared radiometer providing a feedback signal to said laser.

7. The laser power delivery system of claim 6, further comprising:

a mirror chopper and a laser power managing device (LPMD);

said chopper reflecting said IR-radiation leaving said input end of said fiber to said infrared radiometer; and said infrared radiometer providing feedback to said LPMD.

8. The laser power delivery system of claim 5, further comprising:

a temperature sensing means mounted near said output edge; and said temperature sensing means protecting said output end from overheating by providing a feedback signal to said laser.

9. The laser power delivery system of claim 4, further comprising:

a protective sleeve encasing said output end and said tip;

said output end and said sleeve forming a gas passageway for a non-toxic gas;

said gas providing sufficient pressure at said output end to prevent contamination of said output end; and said gas also providing pressure at a tissue surface to remove charring products.

10. The laser power delivery system of claim 3, further comprising:

a single mode hollow waveguide mounted coaxially with said axis of said fiber;

said waveguide being fabricated from materials having a refractive index $n_w$ less than 1 and having a complex index of refraction $v=n_w+ik$, wherein k is an extinction coefficient;

said waveguide being mounted at an angle $\beta_2$ relative to a perpendicular of said output end of said single mode fiber; and said angle $\beta_2$ being defined by $$\beta_2 = \arctan(n/n_2).$$

11. The laser power delivery system of claim 10, further comprising:

a laser optically connected to said fiber;

said fiber generating an incident beam having a linear polarization, said laser being positioned such that said incident laser beam strikes said input surface at an angle $\beta_1$ relative to a perpendicular of said input surface; and said angle $\beta_1$ being defined by $$\beta_1 = \arctan(n/n_1).$$

12. The laser power delivery system of claim 11, further comprising:

an infrared radiometer for measuring IR-radiation leaving said input end; and said infrared radiometer providing a feedback signal to said laser.

13. The laser power delivery system of claim 12, further comprising:

a mirror chopper and a laser power managing device (LPMD);

said chopper reflecting said IR-radiation leaving said input end of said fiber to said infrared radiometer; and said infrared radiometer providing feedback to said LPMD.

14. The laser power delivery system of claim 11, further comprising:

a temperature sensing means mounted near said output edge; and said temperature sensing means protecting said output end from overheating by providing a feedback signal to said laser.

15. The laser power delivery system of claim 10, further comprising:

a protective sleeve encasing said output end and said tip;

said output end and said sleeve forming a gas passageway for a non-toxic gas;

said gas providing sufficient pressure at said output end to prevent contamination of said output end; and said gas also providing pressure at a tissue surface to remove charring products.

16. The laser power delivery system of claim 3, wherein said input surface is inclined at an angle $\alpha_1 sm$ relative to said axis, said angle $\alpha_1 sm$ is defined by $$\alpha_1 sm = 90 - \arcsin((n_1/n)\sin(\arctan(n/n_1))).$$

17. The laser power delivery system of claim 16, further comprising:

a laser optically connected to said fiber;

said fiber generating an incident beam having a linear polarization, said laser being positioned such that said incident laser beam strikes said input surface at an angle $\beta_1$ relative to a perpendicular of said input surface; and said angle $\beta_1$ being defined by $$\beta_1 = \arctan(n/n_1).$$

18. A laser power delivery device comprising:

an infrared transmitting optical fiber;

said fiber having a core with an axis, a diameter $\phi_c$, and a refractive index n higher than 1.6, a cladding with an outer diameter $\phi_f$ and a refractive index $n_{cl}$ lower than said refractive index n, an input end surrounded by a media with a refractive index $n_1$, and an output end;

a hollow tube;

said tube having an output edge and an inner diameter $\phi_i$ larger than said outer diameter $\phi_f$ of said fiber;

said fiber being coaxially inserted in said tube such that a distance L is maintained from said fiber's output end surface to said output edge of said tube;

said distance L corresponding to divergence $\omega$ of a laser beam emitted from said core of said fiber and being defined by $$L = (\phi_i - \phi_c)/(2 \times \tan(\omega/2)).$$

19. The laser power delivery system of claim 18, further comprising:

a laser optically connected to said fiber;

said fiber generating an incident beam having a linear polarization, said laser being positioned such that said incident laser beam strikes said input surface at an angle $\beta_1$ relative to a perpendicular of said input surface; and said angle $\beta_1$ being defined by $$\beta_1 = \arctan(n/n_1).$$

20. The laser power delivery system of claim 19, further comprising:

an infrared radiometer for measuring IR-radiation leaving said input end; and said infrared radiometer providing a feedback signal to said laser.

21. The laser power delivery system of claim 20, further comprising:

a mirror chopper and a laser power managing device (LPMD);

said chopper reflecting said IR-radiation leaving said input end of said fiber to said infrared radiometer; and said infrared radiometer providing feedback to said LPMD.

22. The laser power delivery system of claim 18, further comprising:

a protective sleeve encasing said output end and said tip;

said output end and said sleeve forming a gas passageway for a non-toxic gas;

said gas providing sufficient pressure at said output end to prevent contamination of said output end; and said gas also providing pressure at a tissue surface to remove charring products.

23. The laser power delivery system of claim 19, further comprising:

a temperature sensing means mounted near said output edge; and said temperature sensing means protecting said output end from overheating by providing a feedback signal to said laser.

24. A laser power delivery system comprising:

an infrared transmitting optical fiber;

said fiber having a core with an axis and a refractive index n higher than 1.6, a cladding with a refractive index $n_{cl}$ lower than said refractive index n, an input end surrounded by a media with a refractive index $n_1$, and an output end;

a solid optical tip having an input edge and an output edge;

said input edge in intimate contact with said output end of said optical fiber tip;

a laser optically connected to said fiber;

said fiber generating an incident beam having a linear polarization;

said laser being positioned such that said incident laser beam strikes said input end's surface at an angle $\beta_1$ relative to a perpendicular of said input end's surface; and said angle $\beta_1$ being defined by $$\beta_1 = \arctan(n/n_1).$$

25. The laser power delivery system of claim 24, further comprising:

a temperature sensing means mounted near said output edge; and said temperature sensing means protecting said output end from overheating by providing a feedback signal to said laser.

26. The laser power delivery system of claim 24, further comprising:

an infrared radiometer for measuring IR-radiation leaving said input end; and said infrared radiometer providing a feedback signal to said laser.

27. The laser power delivery system of claim 26, further comprising:

a mirror chopper and a laser power managing device (LPMD);

said chopper reflecting said IR-radiation leaving said input end of said fiber to said infrared radiometer; and said infrared radiometer providing feedback to said LPMD.

28. The laser power delivery system of claim 24, further comprising:

a protective sleeve encasing said output end and said tip;

said output end and said sleeve forming a gas passageway for a non-toxic gas;

said gas providing sufficient pressure at said output end to prevent contamination of said output end; and said gas also providing pressure at a tissue surface to remove charring products.

\* \* \* \* \*